(12) United States Patent
Ponvert et al.

(10) Patent No.: US 9,230,013 B1
(45) Date of Patent: Jan. 5, 2016

(54) SUFFIX SEARCHING ON DOCUMENTS

(71) Applicant: StoredIQ, Inc., Austin, TX (US)

(72) Inventors: Elias Ponvert, Austin, TX (US);
William Kalter, Cedar Park, TX (US);
Jozsef Szalay, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 13/788,914

(22) Filed: Mar. 7, 2013

(51) Int. Cl.
*G06F 17/30* (2006.01)

(52) U.S. Cl.
CPC .................. *G06F 17/30675* (2013.01)

(58) Field of Classification Search
CPC ............ G06F 17/30985; G06F 17/211; G06F 17/30625; G06F 17/3066; G06F 17/30448
USPC .......................................................... 707/759
See application file for complete search history.

(56) References Cited

U.S. PATENT DOCUMENTS

| | | | |
|---|---|---|---|
| 6,714,906 B1 * | 3/2004 | Ji et al. ............................ | 704/10 |
| 7,610,329 B2 | 10/2009 | Bone et al. | |
| 8,032,501 B2 | 10/2011 | Bone et al. | |
| 8,086,553 B2 * | 12/2011 | Bone et al. ...................... | 706/47 |
| 8,095,549 B2 * | 1/2012 | Shankara ....................... | 707/755 |
| 8,417,718 B1 * | 4/2013 | Finkelstein et al. ........... | 707/767 |
| 8,498,972 B2 * | 7/2013 | Transier et al. ............... | 707/696 |
| 8,612,404 B2 | 12/2013 | Bone et al. | |
| 8,898,101 B2 | 11/2014 | Bone et al. | |
| 2007/0106640 A1 * | 5/2007 | Shankara ........................... | 707/3 |
| 2008/0022094 A1 * | 1/2008 | Gupta et al. .................... | 713/165 |
| 2008/0177717 A1 * | 7/2008 | Kumar et al. ...................... | 707/4 |
| 2008/0204282 A1 * | 8/2008 | Jeon ................................. | 341/22 |
| 2009/0063465 A1 * | 3/2009 | Ferragina et al. ................. | 707/5 |
| 2010/0161618 A1 * | 6/2010 | Kim et al. ...................... | 707/748 |
| 2011/0055232 A1 * | 3/2011 | Graefe ............................ | 707/752 |
| 2011/0055233 A1 * | 3/2011 | Weber et al. .................. | 707/752 |
| 2011/0179013 A1 * | 7/2011 | Jiang et al. .................... | 707/711 |
| 2012/0047025 A1 * | 2/2012 | Strohman .................. | 705/14.71 |
| 2012/0117076 A1 * | 5/2012 | Austermann ................. | 707/741 |
| 2012/0158782 A1 * | 6/2012 | Transier et al. ............... | 707/771 |
| 2013/0204897 A1 * | 8/2013 | McDougall .................... | 707/780 |
| 2013/0246337 A1 * | 9/2013 | Ahuja et al. .................. | 707/601 |

* cited by examiner

*Primary Examiner* — Debbie Le
(74) *Attorney, Agent, or Firm* — Yeen Tham; Edell, Shapiro & Finnan, LLC

(57) ABSTRACT

Embodiments of a system for searching text indices for suffixes are disclosed. Embodiments may include a suffix searching module at a computer configured to receive a query and identify the query as a suffix query, extract a suffix from an identified suffix query and reverse an order of characters in the suffix, and search a secondary index for terms corresponding to the reverse-ordered suffix, the secondary index comprising one or more lists of reverse-ordered terms from a primary index; a search reconfiguration module operably coupled to the suffix searching module and configured to receive from the suffix searching module found terms corresponding to the reverse-ordered suffix and reverse an order of the characters of the found terms; and a search module configured to implement a search of a primary index using reverse-ordered found terms received from the search reconfiguration module.

15 Claims, 4 Drawing Sheets

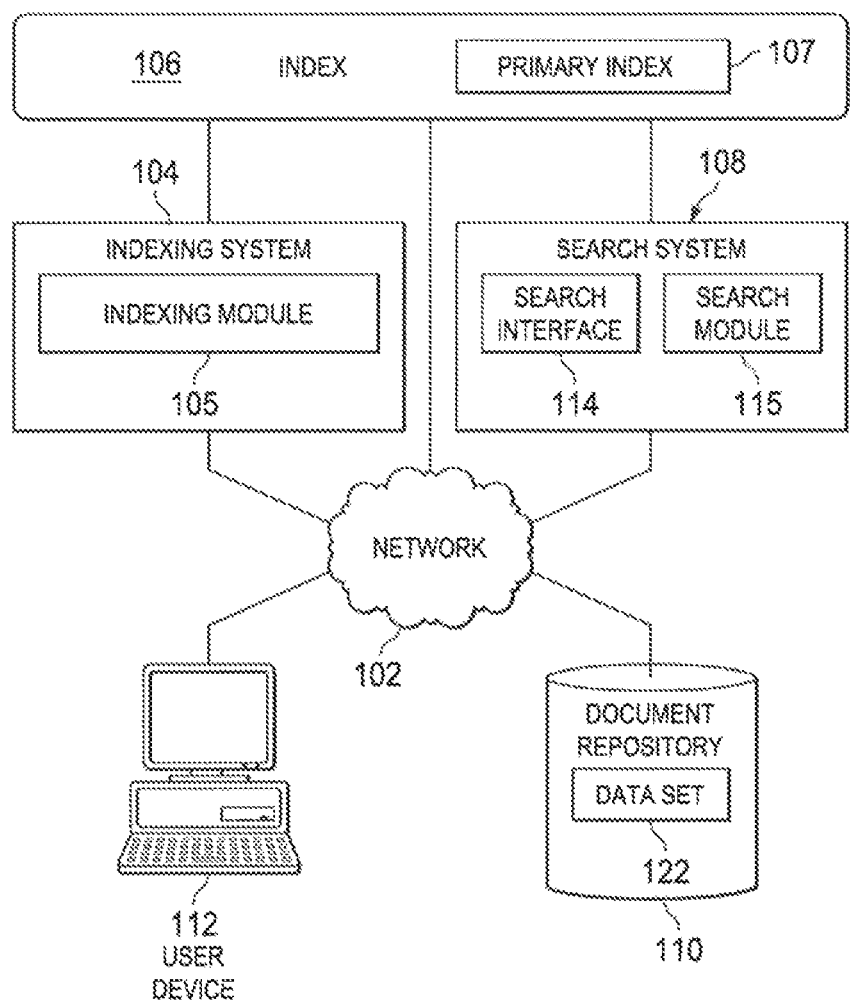

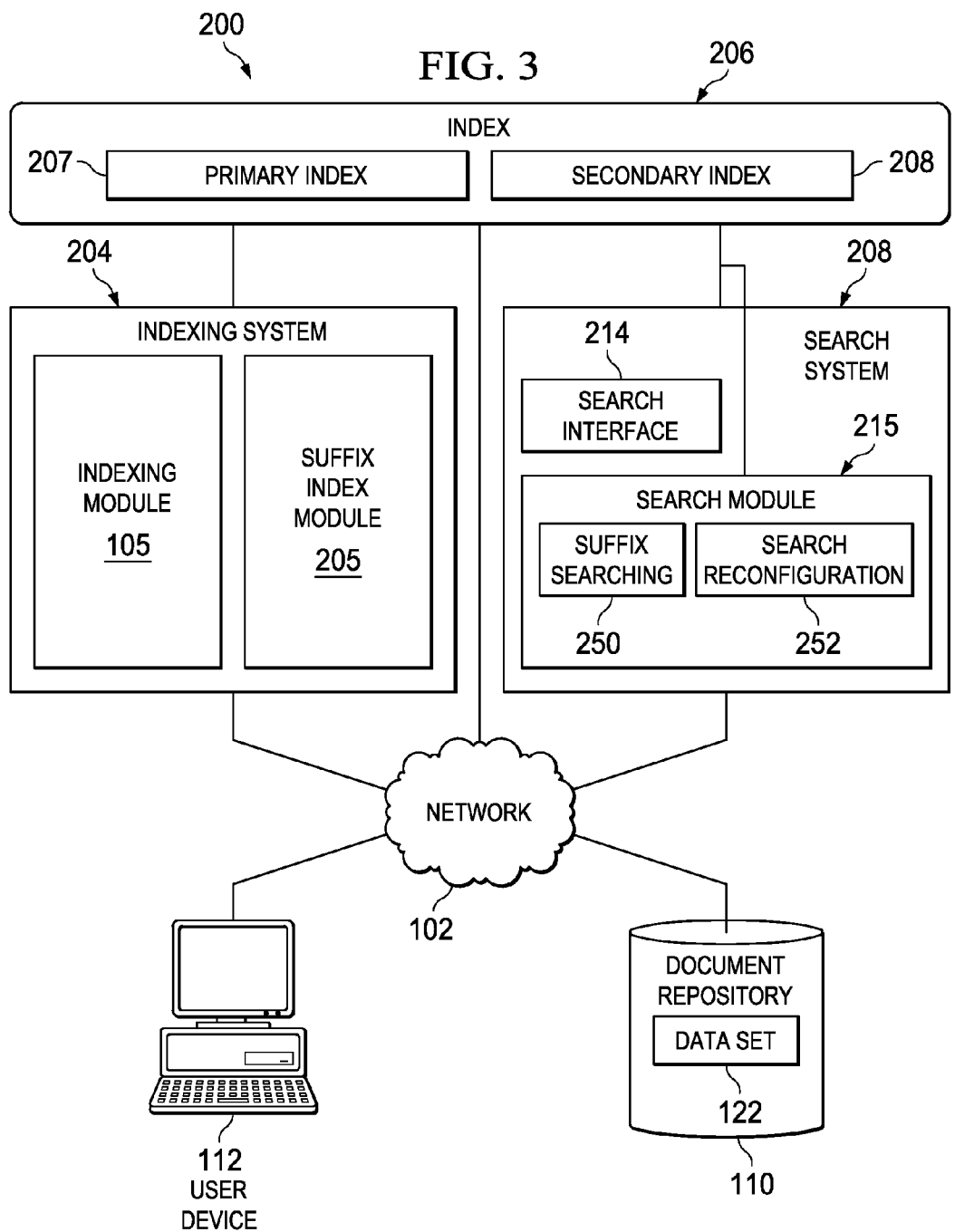

SUFFIX SEARCHING ON DOCUMENTS

TECHNICAL FIELD

This disclosure relates generally to searching data storage resources. More specifically, this disclosure relates to embodiments of systems, methods, and apparatuses for efficiently implementing suffix searches on documents.

BACKGROUND

Full text indexing and searching are useful capabilities in many applications today, such as in Internet search engines or local or single-site searching. For example, Apache Lucene is an open source full text indexing engine that creates an inverted index by reading documents and tokenizing them. The index is thus the result of extracting terms and identifying various metadata associated with the terms, such as which documents the terms are from and the placement of the terms in the particular documents. Thus, an index comprises a list of terms. Each instance of the occurrence of a term in a document may be associated with the term in the index. For example, an identifier of the document and the location of the occurrence in that document may be associated with the term for each instance of the occurrence of the term.

Search engines may utilize such indices to search the documents. For example, Apache Solr is a search framework that uses such an index for full-text searching. In general, Solr receives a query and tokenizes the search terms, identifying Boolean operators and implementing a search of documents using the index created from those documents.

To illustrate, if a query was "Victor Frankenstein," the search engine might identify "Victor" and "Frankenstein" and build a binary search "Victor AND Frankenstein," and search for documents that contain both terms using the index created from those documents. Similarly, wildcard operators may be employed in certain search engines. These wildcard operators may be used to perform prefix searches, which comprise a prefix followed by a wildcard, and suffix searches, which comprise a wildcard followed by a suffix. If a wildcard prefix operator was employed in a search query for a prefix search, the search engine would generate a search for all documents that contained the prefix. For example, suppose the search was "Frank*," where "*" is the wildcard operator. In this case, the search engine would generate a search for documents which contain terms which begin the prefix "Frank." Such a prefix search may be relatively straightforward to implement, as the index created from the documents being searched may be sorted alphabetically by term. Thus, when searching using the documents, the index may be relatively quickly processed to determine which terms begin with "Frank" and the documents associated with these terms determined.

However, a similar search for a suffix may be quite a bit more complicated. For example, suppose a suffix search of the nature of "*ing," where "*" is a wildcard operator is desired.

In this case the search engine may perform a search for all documents containing a term ending in "ing". As the structure of the index created from the documents being searched may comprise an alphabetically sorted list of terms this search may entail, for example, a string comparison with every term in the index beginning with the last letter of the term and the last letter of the suffix (e.g., a reverse string comparison), to locate each term in the index which ends in the suffix of interest. The documents associated with those terms can then be determined. Since indices can include tens, if not hundreds of thousands of terms, performing such searches can be relatively time-consuming.

SUMMARY

A system for searching text indices for suffixes according to embodiments includes a suffix searching module at a computer configured to receive a query and identify the query as a suffix query, extract a suffix from an identified suffix query and reverse the order of characters in the suffix, and search a secondary index for terms corresponding to the reverse-ordered suffix, the secondary index comprising one or more lists of reverse-ordered terms from a primary index; a search reconfiguration module operably coupled to the suffix searching module and configured to receive from the suffix searching module found terms corresponding to the reverse-ordered suffix and reverse an order of the characters of the found terms; and a search module configured to implement a search of a primary index using reverse-ordered found terms received from the search reconfiguration module.

A computer program product according to some embodiments includes one or more tangible computer readable storage media storing instructions translatable by one or more processors to: receive a query and identify the query as a suffix query; extract a suffix from an identified suffix query and reverse the order of characters in the suffix; search a secondary index for terms corresponding to the reverse-ordered suffix, the secondary index comprising one or more lists of reverse-ordered terms from a primary index; reverse the order of the characters of the found terms; and implement a search of a primary index using reverse-ordered found terms received from the second inversion module. In some embodiments, the search of the primary index is implemented by generating a Boolean search using the reverse-ordered found terms.

A computer-implemented method in accordance with some embodiments includes receiving a query and identifying the query as a suffix query; extracting a suffix from an identified suffix query and reversing the order of characters in the suffix; searching a secondary index for terms corresponding to the reverse-ordered suffix, the secondary index comprising one or more lists of reverse-ordered terms from a primary index; reversing the order of the characters of the found terms; and implementing a search of a primary index using reverse-ordered found terms received from the second inversion module. In some embodiments, implementing the search of the primary index comprises generating a Boolean search using the reverse-ordered found terms.

Additional objects and advantages will become apparent to one skilled in the art upon reading and understanding exemplary embodiments described herein with reference to the following drawings.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein:

FIG. 1 illustrates an exemplary network system;

FIG. 2 illustrates operations of embodiments by way of example;

FIG. 3 illustrates an exemplary network system in which embodiments may be implemented;

DETAILED DESCRIPTION

Figure 4:
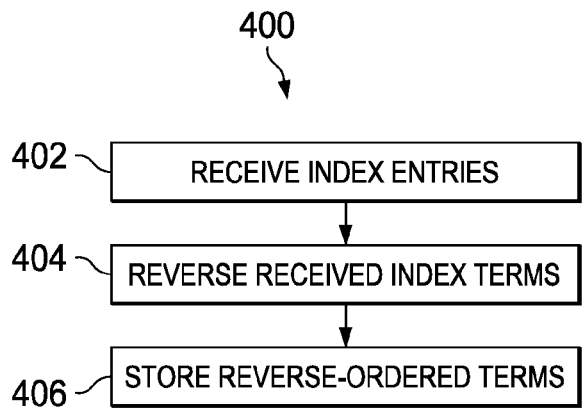
FIG. 4 is a flowchart illustrating operation of embodiments.

The disclosure and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the disclosure in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In some embodiments, the computer has access to at least one database, which may be local or be accessed over the network. ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alliteratively, the computer-executable instructions may be stored as software code components on a DASD array, magnetic tape, floppy diskette, optical storage device, or other appropriate computer-readable medium or storage device.

In one exemplary embodiment, the computer-executable instructions may be lines of C++, Java, HTML, or any other programming or scripting code. Other software/hardware/network architectures may be used. For example, the functions of some embodiments may be implemented on one computer or shared among two or more computers. In one embodiment, the functions may be distributed in the network.

Communications between computers implementing embodiments can be accomplished using any electronic, optical, ratio frequency signals, or other suitable methods and tools of communication in compliance with known network protocols.

Moving on, embodiments disclosed herein can comprise systems and methods for improved suffix searching and indexing. Turning now to the drawings and, with particular attention to FIG. 1, a diagram illustrating one embodiment of a search system is shown and generally identified by the reference numeral 100. In the embodiment illustrated, a data network 102 (e.g., a LAN, a WAN, the Internet, a wireless network or other network known in the art) communicatively couples an indexing system 104, an index store 106, a search system 108, a document repository 110, and one or more user devices 112.

The document repository 110 stores one or more data sets 122 of documents of interest. Documents may include any files containing text, and may be in any public or proprietary formats. Exemplary text formats include WORD, PDF, RTF, TXT, XML, HTML, or other formats.

The indexing system 104 employs an indexing module 105 for indexing documents in the document repository 110 to create a primary index 107 in the index store 106. In general, the indexing system 104 processes documents from the document repository 110, extracting terms from each document and adding them to the primary index 107. The primary index 107 comprises one or more lists of terms, each term associated with each of the documents in the data set 122 in which it appears. For example, the term may be associated with one or more document identifications or IDs. Other information may also be associated with the primary index 107, such as where in each document the term appears and frequency of appearance, etc.

Thus, in certain embodiments the primary index 107 may comprise a list of terms. Each instance of the occurrence of a term in a document may be associated with the term in the primary index 107. For example, an identifier of the document and the location of the occurrence in that document may be associated with the term for each instance of the occurrence of the term.

To generate the primary index 107, the documents in a data set 122 are processed (e.g., by text extraction and a tokenizer or the like) to generate the terms of a document. Indexing module 105 receives these terms and determines if a term should be indexed. If indexing module 105 determines that the term should be indexed, the indexing module 105 checks to see if it that term is present in primary index 107. If not, it is entered in the primary index 107. The associated information related to the occurrence of that term (such as document ID, placement within the document, etc.) in the document in which it appears is also entered.

The primary index 107 may be arranged in any suitable manner, such as an ordered list or table. The primary index 107 may be arranged, for example, in alphabetical order by terms or alphanumerically by document ID. Such an arrangement may aid or speed access or searching of primary index 107.

The search system 108 includes a search interface 114 for receiving queries from users at user devices 112 over the network 102, and a search module 115 implementing a search engine for executing searches of the documents 122 using primary index 107. The user devices 112 may be implemented as any suitable devices for communicating over the network 102, such as personal or laptop computers, cellular telephones, smartphones, and the like.

Thus, to perform a search related to documents in data set 122, a user at user device 112 uses search interface 114 to input a query including one or more search terms which are received at the search system 108 via a search interface 114. The search module 115 receives the search terms and interacts with the primary index 107 to find a set of documents responsive to the search.

A difficulty can arise, however, if suffix searches are desired. For example, a search of the form "*ABC," where "*" is a wildcard operator, and ABC are alphanumeric (or other) characters may be time-consuming on large indexes. As discussed above, the structure of the index created from the documents being searched may comprise an alphabetically sorted list of terms. Accordingly a suffix search of this type may entail, for example, a string comparison with every term in the primary index 107 beginning with the last letter of the term and the last letter of the suffix (e.g., a reverse string comparison), to locate each term in the index which ends in the suffix of interest. The documents associated with these terms can then be determined in formulating a response to the search. Since indices can include tens, if not hundreds of thousands of terms, processing can be relatively complex. The impact to the processing of a query may be especially problematic as it directly affects the time a user must wait between the user's entering of the query and the time results of the query are returned to the user.

What is desired then, are systems and methods which allow suffix searches which reduce the processing time associated with the implementation of such search using an index, and in particular that may reduce the time associated with the implementation of such suffix searches in using an index of terms that is sorted alphabetically (or otherwise) and which may reduce the processing time required when processing and returning results to a query. To that end, attention is now directed to the embodiments of systems and methods for suffix searches for indexing and searching presented herein.

Specifically, an indexing process according to embodiments creates a secondary index for suffix searches. In particular, embodiments create a secondary index comprising "inverted" or "mirror-image" terms corresponding to terms in the primary index. That is, to generate the secondary index, terms in the primary index have the order of characters reversed. Thus, each term in the primary index may have a corresponding term in the secondary index which is an inversion of the term. To perform suffix searches, then, a suffix may itself has its characters reversed and the secondary index is searched using the reversed suffix to determine any terms of the of the secondary index which begin with the reversed suffix. Matching terms from the secondary index are then reversed and these resulting terms are used to search the documents using the primary index.

Thus, according to some embodiments, inverted terms are stored in the secondary index for those terms that the process actually encountered during indexing of the documents to be searched. Advantageously, by maintaining a second index of the inverted terms of the primary index, where the secondary index may itself be ordered, the time needed to implement a suffix search may be significantly reduced as well. It is noted that, in some embodiments, the secondary index does not contain metadata for the term, which is already stored in the primary index.

FIG. 2 illustrates operation of embodiments by way of example. Shown in FIG. 2 are a primary index 207 and a secondary index 208. In the example illustrated, primary index 207 includes terms 902 Abaa, Abca, Baa, and Bbc. In addition to the terms 902, additional metadata or indexing information 904 is provided. Such information may include the documents in which the terms are found, etc.

In addition, the indexing process creates mirror-images or reverse-ordered terms (e.g., by reversing the order of characters of the terms) from the primary index 207 and stores these reverse-ordered terms 906 in the secondary index 208. For example, the term abaa may be identified during the indexing process as a term which should be indexed in the primary index. Thus, the indexing process may create the corresponding reverse-ordered term aaba and store this term in the secondary index. Similarly, aab may be created and stored in the secondary index as the reverse of the term baa stored in the primary index, acba may be created and stored in the secondary index as the reverse of the term abca stored in the primary index, and cbb may be created and stored in the secondary index as the reverse of the term bbc stored in the primary index. As can be seen the terms of the secondary index may also be ordered (e.g., alphabetically to aid in searching or processing of the secondary index).

As will be explained in greater detail below, when a suffix search is input (e.g., a search that includes at least one term that includes a wildcard with a suffix), the suffix may be reversed and used to search the secondary index to determine any terms of the secondary index which match the reversed suffix. Matching terms from the secondary index can then be reversed and used to reformulate the query (e.g., by substituting a Boolean expression including the reversed terms from the secondary index into the original query in place of the suffix search term). For instance, the search for *ca may first reverse the suffix "ca" to get "ac" and search the secondary index 208 for terms beginning with "ac". In the example illustrated, this may include acba. The found term in the secondary index (here acba) terms are then themselves reversed and used to search the primary index. That is, in the example illustrated, the search query may be reformulated as "abca." This reformulated search may then be performed on the primary index 207 and documents responsive to the reformulated search returned to the user. Similarly, with reference to this example, the search for *aa may first reverse the suffix "aa" to get "aa" and search the secondary index 208 for terms beginning with "aa". In the example illustrated, this may include aab and aaba. The found terms in the secondary index (here aab and aaba) are then themselves reversed and used to reformulate the query, and the reformulated query may be used to search the documents using the primary index. Here, for example, the search query may be reformulated as "baa OR abaa".

Turning now to FIG. 3, a diagram illustrating an exemplary search system is shown and generally identified by the reference numeral 200. In the embodiment illustrated, a data network 102 (e.g., a LAN, a WAN, the Internet, a wireless network or other network known in the art) communicatively couples an indexing system 204, an index store 206, a search system 208, a document repository 110, and one or more user devices 112.

As discussed above, the indexing system 204 employs an indexing module 105 for indexing documents in the document repository 110 to create a primary index 207 in the index store 206. The primary index 207 comprises one or more lists of terms, each term associated with each of the documents in the data set 122 in which it appears. For example, the term may be associated with one or more document identifications or IDs. Other information may also be associated with the primary index 207, such as where in each document the term appears and frequency of appearance, etc. Thus, in certain embodiments the primary index 207 may comprise a list of terms. Each instance of the occurrence of a term in a document may be associated with the term in the primary index 207. For example, an identifier of the document and the location of the occurrence in that document may be associated with the term for each instance of the occurrence of the term.

The index store 206 further maintains a secondary index 208. The secondary index 208 may comprise reverse-ordered terms from the primary index 207. For example, the secondary index 208 may be ordered, for example, alphabetically, for increased efficiency of searching.

In addition, the indexing system 204 includes a suffix index module 205 for populating the secondary index 208. The suffix index module 205 receives terms that are to be indexed and reverses the order of the characters of the term and stores them in the secondary index 208. For example, if a term in the primary index 207 is ABCDEF, then the suffix index module 205 reverses the order of the characters of the term so that it is entered as FEDCBA.

The search system 208 includes a search interface 214 for receiving queries from users at a user device 112 over the network 102, and a search module 215 implementing a search engine for executing searches of the primary index 207. The search module 215 further includes a suffix searching module 250 and a search reconfiguration module 252.

The suffix searching module 250 receives queries from the search interface 214 and analyzes them to determine if a query is a suffix query, for example, by identifying a wildcard operator. Once it is determined that the query is a suffix search, the suffix searching module 250 reverses the order of the characters of the suffix term. The reverse ordered suffix term is used to search the secondary index 208. Found terms from the secondary index 208 then themselves have their characters reversed (so that they are now noninverted with respect to the original term indexed in primary index 207).

The found terms are provided to the search reconfiguration module 252, which reformulates the search to include all the noninverted found terms to search the documents 122 in the primary index 207. In some embodiments, the query may be reformulated as a Boolean search.

FIG. 4 is a flowchart 400 illustrating exemplary secondary index generation according to embodiments. The indexing module 105 receives or generates the primary index 207 (step 402). Next, the suffix index module 205 processes each indexed term by performing an inversion or reversal of the characters for each index term (step 404). That is, the suffix index module 205 will create a "mirror image" of the index term. The suffix index module 205 will then store the reverse-ordered terms (step 406) in the secondary index 208.

Figure 5:
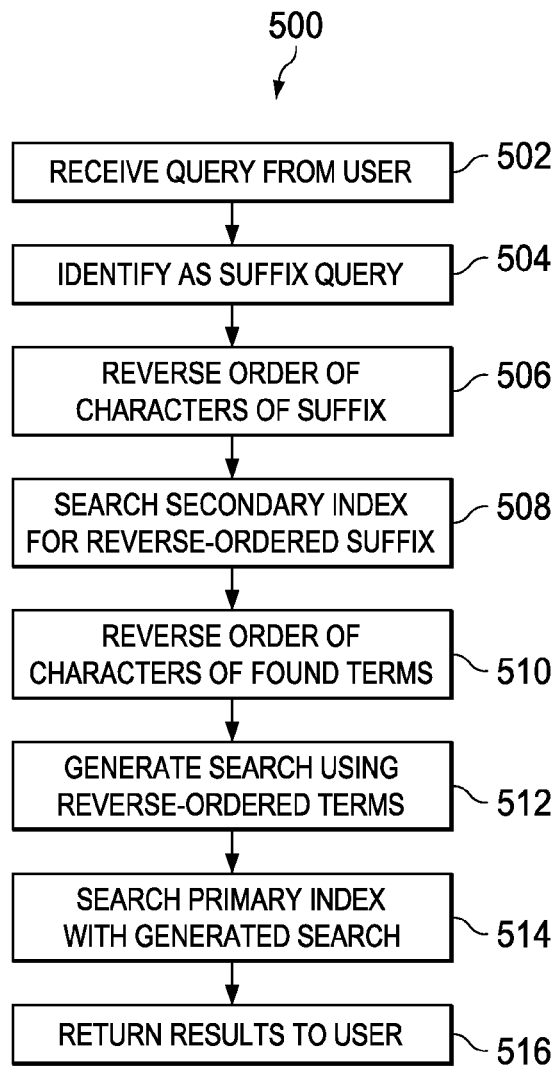
FIG. 5 is a flowchart illustrating operation of embodiments.

Operation of an embodiment for implementing a suffix search is illustrated with reference to the flowchart 500 of FIG. 5. A query may be received by the search system 208 (Step 502). For example, such a query may be received from one of the user devices 112 via the network 102 (FIG. 3). The query is identified all or in part as a suffix query by the suffix searching module 250 (Step 504). For example, as noted above, the suffix searching module 250 may be configured to automatically identify one or more "wildcard" characters, such as *, !, etc., as indicating that the query is a suffix query. In other embodiments, a user may employ menu or other controls when submitting the query to identify the query as, or including, a suffix query.

If the query is not a suffix query, the query may be processed by the search module 215 in a standard fashion, i.e., by searching the primary index 207. If the query is identified as containing a suffix query, however, the suffix searching module 250 performs a mirror image transformation, inversion, or character reversal on the query term that is identified as referring to a suffix (step 506). The inverted suffix is then used by the suffix searching module 250 to search the secondary index 208 (step 508).

The terms, if any, found in the secondary index 208 that correspond to the reverse-ordered search are received by and themselves inverted by the search reconfiguration module 252 (step 510). The search reconfiguration module 252 receives the reverse-ordered terms and generates a binary or Boolean search (step 512) using the terms. That is, the terms from the secondary index are concatenated in a logical OR and used as by the search module 215 to conduct a Boolean search on the primary index (step 514). Finally, the results of the query, if any, are returned to the user (step 516).

While it should be noted that embodiments as described and claimed may be utilized in almost any document search system, it may be helpful here to give one example of an architecture where such embodiments may be useful.

Figure 6:
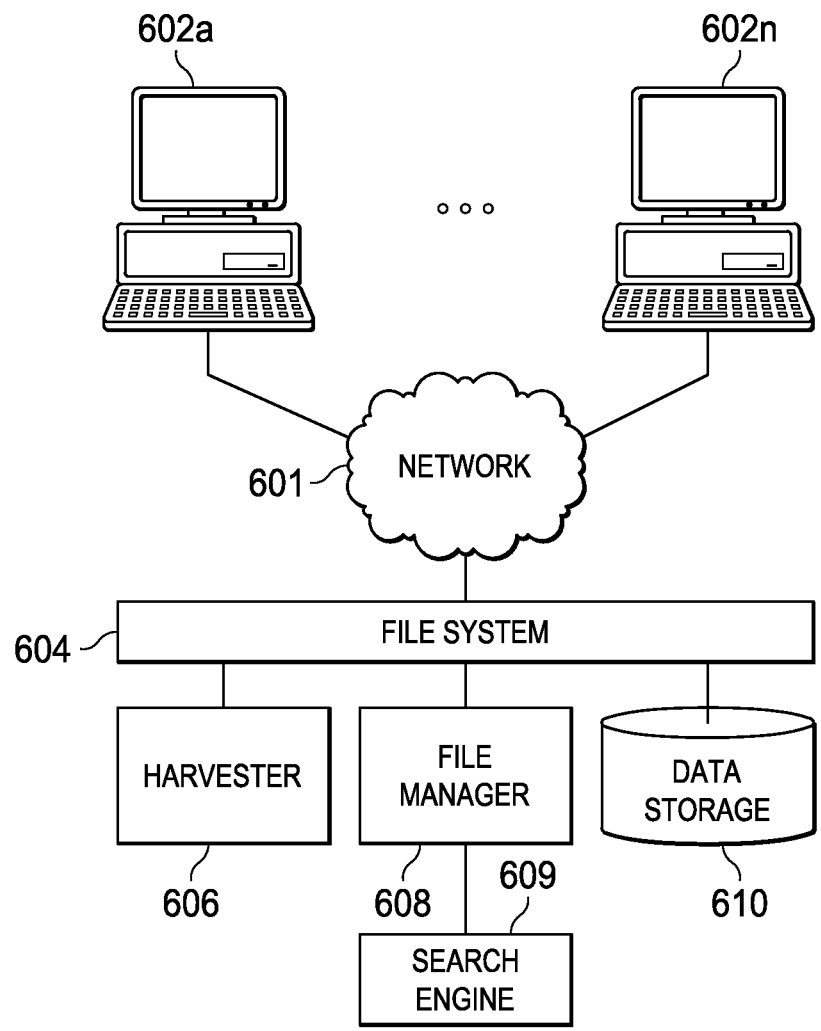
FIG. 6 is a diagram illustrating an exemplary network environment.

FIG. 6 is a diagrammatic representation of a network system in which file system management and index searching can be implemented according to embodiments disclosed herein. A data network 601 (e.g., a LAN, a WAN, the Internet, a wireless network or other network known in the art) connects a number of computers 602a-602n and a file system 604. One or more of the computers 602a-602n may be, for example, personal computers, tablet computers, laptop computer, workstations or other devices capable of communicating over or sharing data via the network 601. In addition, or alternatively, one or more of the computers 602a-602n may be servers connected to one or more storage devices (e.g., hard drives, tape drives, disk drives or other storage media device known in the art) whose content may be shared out over network 601 according to a network file system protocol.

The file system 604 may be implemented as a server and may include or be coupled with a harvester 606, a search engine 609, a file system manager 608, and data storage 110. The harvester 606 may be configured to "harvest" file data or metadata from computers and/or servers of interest on network 601 and store them in data storage 610 (e.g. as a data set of documents). Harvested file data or metadata may be used to build one or more indices suitable for use in a searching system according to embodiments. Metadata may comprise, for example, a file name, some explicit/static information such as its owner, size, and so on, its contents or data, and an arbitrary and open set of implicit or "dynamic" metadata such as the file's content type, checksum, and so on. Data storage 610 may further store primary and secondary indices, as described above. Accordingly, the file data or metadata harvested from one or more file systems 604 by harvester 606 and stored in data storage 610 may be efficiently searched for suffixes using embodiments of the systems and methods presented herein.

Further details of an exemplary harvesting and file management system may be found in commonly-assigned, U.S. patent application Ser. No. 12/572,116, filed Oct. 1, 2009, entitled "Method and Apparatus for Harvesting File System Metadata," now U.S. Pat. No. 8,612,404, which is hereby incorporated by reference in its entirety as if fully set forth herein. Exemplary systems and methods for managing file systems may be found in commonly-assigned U.S. Pat. No. 7,610,329, U.S. Pat. No. 8,032,501, U.S. Pat. No. 8,086,553, and commonly-assigned U.S. patent application Ser. No. 13/301,503, now U.S. Pat. No. 8,898,101, all of which are hereby incorporated by reference in their entireties as if fully set forth herein.

Although embodiments have been described and illustrated in detail, it should be understood that the embodiments and drawings are not meant to be limiting. Various alterations and modifications are possible without departing from the spirit and scope of the disclosure. Accordingly, the scope of the disclosure should be determined by the following claims and their legal equivalents.

What is claimed is:

1. A system for searching text indices for suffixes, comprising:
   a computer;
   a suffix searching module at the computer configured to:
      receive a query and identify the query as a suffix query;
      extract a suffix from the identified suffix query and reverse an order of characters in the suffix; and
      search a secondary index for terms corresponding to the reverse-ordered suffix, the secondary index comprising one or more lists of reverse-ordered terms from a primary index;
   a search reconfiguration module operably coupled to the suffix searching module and configured to receive found terms from the secondary index corresponding to the reverse-ordered suffix and reverse an order of the characters of the found terms; and
   a search module configured to implement a search of the primary index using reverse-ordered found terms received from the search reconfiguration module.

2. The system according to claim 1, wherein, to implement the search of the primary index, the search reconfiguration module is configured to generate a Boolean search using the reverse-ordered found terms.

3. The system according to claim 2, wherein the search module is configured to perform the query using the Boolean search of reverse-ordered found terms.

4. The system according to claim 1, wherein the suffix query is identified from one or more wildcard characters.

5. The system according to claim 1, wherein the primary index comprises an inverted index.

6. A computer program product comprising one or more tangible computer readable storage media storing instructions translatable by one or more processors to:
   receive a query and identify the query as a suffix query;
   extract a suffix from the identified suffix query and reverse an order of characters in the suffix;
   search a secondary index for terms corresponding to the reverse-ordered suffix, the secondary index comprising one or more lists of reverse-ordered terms from a primary index;
   reverse an order of the characters of the found terms from the secondary index; and
   implement a search of the primary index using the reverse-ordered found terms.

7. The computer program product according to claim 6, wherein the one or more tangible computer readable storage media storing instructions translatable by one or more processors are further configured to implement the search of the primary index by generating a Boolean search using the reverse-ordered found terms.

8. The computer program product according to claim 7, wherein the one or more tangible computer readable storage media storing instructions translatable by one or more processors are further configured to perform the query using the Boolean search of reverse-ordered found terms.

9. The computer program product according to claim 6, wherein the suffix query is identified from one or more wild-card characters.

10. The computer program product according to claim 6, wherein the primary index comprises an inverted index.

11. A computer-implemented method comprising:
    receiving a query and identifying the query as a suffix query;
    extracting a suffix from the identified suffix query and reversing an order of characters in the suffix;
    searching a secondary index, via a processor, for terms corresponding to the reverse-ordered suffix, the secondary index comprising one or more lists of reverse-ordered terms from a primary index;
    reversing an order of the characters of the found terms from the secondary index; and
    implementing a search of the primary index, via a processor, using the reverse-ordered found terms.

12. The computer-implemented method according to claim 11, wherein implementing the search of the primary index comprises generating a Boolean search using the reverse-ordered found terms.

13. The computer-implemented method according to claim 12, further comprising performing the query using the Boolean search of reverse-ordered found terms.

14. The computer-implemented method according to claim 11, wherein the suffix query is identified from one or more wild-card characters.

15. The computer-implemented method according to claim 11, wherein the primary index comprises an inverted index.

* * * * *